(12) United States Patent
Novakovic et al.

(10) Patent No.: US 8,947,837 B2
(45) Date of Patent: Feb. 3, 2015

(54) OVERCURRENT PROTECTION AND FAULT ISOLATION

(75) Inventors: Nebojsa Novakovic, Mukilteo, WA (US); Jef William Good, German Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 414 days.

(21) Appl. No.: 13/445,272

(22) Filed: Apr. 12, 2012

(65) Prior Publication Data

US 2013/0271877 A1    Oct. 17, 2013

(51) Int. Cl.
*H02H 7/06*    (2006.01)

(52) U.S. Cl.
USPC ............. 361/20; 361/48; 361/63; 361/87; 290/54; 290/55; 318/140

(58) Field of Classification Search
USPC .......... 361/48, 63, 87, 20; 307/19, 29, 84, 87, 307/153; 290/54, 55
See application file for complete search history.

(56) References Cited

U.S. PATENT DOCUMENTS 4,403,292 A * 9/1983 Ejzak et al. ............... 700/297

FOREIGN PATENT DOCUMENTS

WO    2011138298 A2    11/2011

OTHER PUBLICATIONS

European Search Report, Date Jul. 15, 2013; Application No. 13163439.6-1806, pp. 1 1-5.

* cited by examiner

*Primary Examiner* — Eduardo Colon Santana
*Assistant Examiner* — Iftekhar Mustafa
(74) *Attorney, Agent, or Firm* — Cantor Colburn LLP (57) ABSTRACT

An overcurrent fault protection method includes detecting an overcurrent fault in a variable frequency electric power generation system having a first main generator connected to a first alternating current bus through a first generator line contactor, a second main generator connected to a second alternating current bus through a second generator line contactor and an auxiliary power generator connected to a plurality of bus tie contactors, through a third generator line contactor, and connected to at least one of the first and second alternating current buses through the plurality of bus tie contactors, in response to detecting the overcurrent fault, locking out one or more of the plurality of bus tie contactors and in response to a continued detection of the overcurrent fault, opening at least one of the first second and third generator line contactors.

17 Claims, 12 Drawing Sheets

| OVERCURRENT FAULT LOCATION | | | BTC INITIAL CONDITION | | STATE MACHINE TRANSITION PROCESS |
|---|---|---|---|---|---|
| A | B | C | LBTC1_CLOSED | RBTC1_CLOSED | |
| 0 | 0 | 1 | 0 | 0 | IS → OC_PFL |
| 1 | 0 | 0 | 1 | 0 | IS → S1 → IS |
| 0 | 0 | 1 | 1 | 0 | IS → S1 → S0 → OC_PFL |
| 0 | 1 | 0 | 0 | 1 | IS → S2 → IS |
| 0 | 0 | 1 | 1 | 1 | IS → S2 → S0 → OC_PFL |
| 1 | 0 | 0 | 1 | 1 | IS → S3 → IS |
| 0 | 1 | 0 | 1 | 1 | IS → S3 → S2 → IS |
| 0 | 0 | 1 | 1 | 1 | IS → S3 → S2 → S0 → OC_PFL |

OVERCURRENT PROTECTION AND FAULT ISOLATION

BACKGROUND OF THE INVENTION

The present invention relates to overcurrent protection and fault isolation, and more specifically, to overcurrent protection and fault isolation methods for variable frequency multi-channel electric power generation systems.

In aircraft, a Variable Frequency (VF) Electric Power Generation System (EPGS) has three independent alternating current (AC) power channels, including a left engine driven main generator (LGEN), a right engine main generator (RGEN), and an auxiliary power unit (APU) generator (AGEN), where each of the LGEN, RGEN, and AGEN can have access to one or more AC power buses. In the VF EPGS, power transfer is coordinated through a Bus Power Control Unit (BPCU). It is a design feature that each power generation channel has no evidence that an AC power is present on an associated bus or not.

BRIEF DESCRIPTION OF THE INVENTION

Exemplary embodiments include an overcurrent fault protection method, including detecting an overcurrent fault in a variable frequency electric power generation system having a first main generator coupled to a first alternating current bus through a first generator line contactor, a second main generator coupled to a second alternating current bus through a second generator line contactor and an auxiliary generator coupled to a plurality of bus tie contactors, through a third generator line contactor, and coupled to at least one of the first and second alternating current buses through the plurality of bus tie contactors, in response to detecting the overcurrent fault, locking out one or more of the plurality of bus tie contactors and in response to a continued detection of the overcurrent fault, opening at least one of the first second and third generator line contactors.

Additional exemplary embodiments include a computer program product including a non-transitory computer readable medium storing instructions for causing a computer to implement an overcurrent fault protection method. The method includes detecting an overcurrent fault in a variable frequency electric power generation system having a first main generator connected to a first alternating current bus through a first generator line contactor, a second main generator connected to a second alternating current bus through a second generator line contactor and an auxiliary power generator connected to a plurality of bus tie contactors, through a third generator line contactor, and connected to at least one of the first and second alternating current buses through the plurality of bus tie contactors, in response to detecting the overcurrent fault, locking out one or more of the plurality of bus tie contactors and in response to a continued detection of the overcurrent fault, opening at least one of the first second and third generator line contactors.

Further exemplary embodiments include a variable frequency electric power generation system including a first generator connected to a first generator control unit and to a first alternating current bus through a first generator line contactor, a second generator connected to a second generator control unit and to a second alternating current bus through a second generator line contactor and an auxiliary power generator connected to a third generator control unit and to a plurality of bus tie contactors, through a third generator line contactor, and connected to at least one of the first and second alternating current buses through the plurality of bus tie contactors, wherein the first, second and third generator control units are configured to detect overcurrent fault, and in response to detecting the overcurrent fault, lock out one or more of the plurality of bus tie contactors and in response to a continued detection of the overcurrent fault, open at least one of the first second and third generator line contactors.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
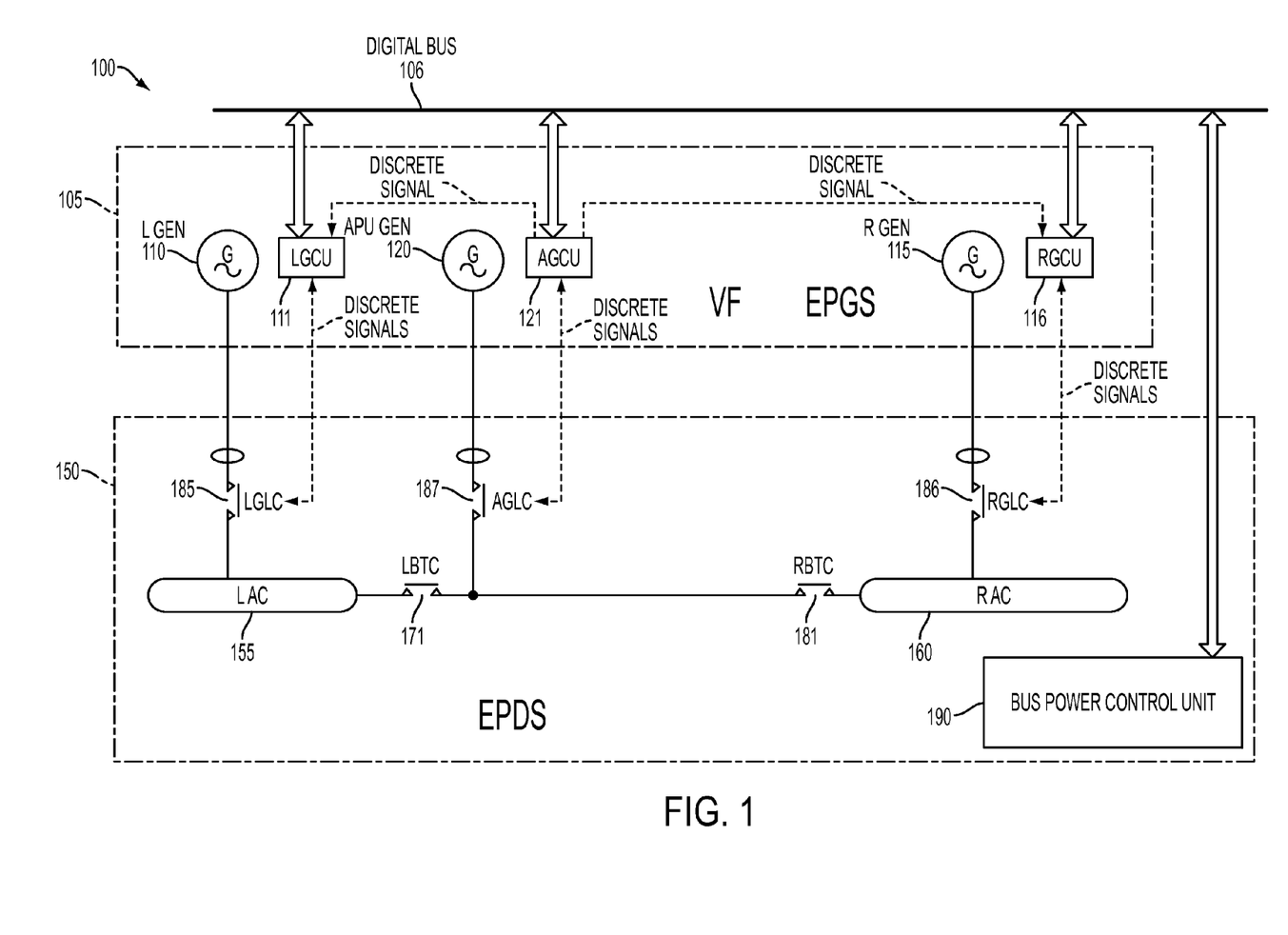
FIG. 1 schematically illustrates a single line diagram of an electric power generation system in which exemplary overcurrent protection methods can be implemented.

FIG. 1 schematically illustrates an electric power generation system 100 in which exemplary overcurrent protection and fault isolation methods can be implemented. It will be appreciated that multiple power variable sources are not connected at the same time to the power electric network sharing the same bus (i.e., parallel sourcing) because it would cause a system failure. Due to difference in AC voltage frequencies and phases (sources are not synchronized), a connection of the two or more different power sources with different frequencies can cause damage to the system 100. The system 100 includes a VF EPGS 105 having three AC power channels and an electric power distribution system (EPDS) 150. In more detail, the illustrated VF EPGS 100 includes three independent AC power channels including an LGEN 110, an RGEN 115, and an AGEN 120. For control, protection and indication functions, each of the LGEN 110, the RGEN 115, and the AGEN 120 has a designated stand-alone generator control unit (GCU) LGCU 111, RGCU 116, AGCU 121, respectively. The EPDS 150 includes two different AC power buses LAC 155, and RLC 160. The EPDS further includes two bus tie contactors (BTC) LBTC 171, and RBTC 181. In one embodiment, with two different BTCs, the two individual AC power busses LAC 155, and RAC 160 can be combined in different configurations to allow power sharing from a load point of view. The EPDS 150 further includes a bus power control unit (BPCU) 190 configured to perform the control processed described herein. The LGCU 111, the RGCU 116, the AGCU 121 and the BPCU 190 are all communicating across digital bus 106.

The EPDS 150 also includes a left generator line contactor (LGLC) 185 located between the LGEN 110 and the LAC bus 155, a right generator line contactor (RGLC) 186 located between the RGEN 115 and the RAC bus 160, an AGEN line contactor (AGLC) 187 located between the AGEN 120 and BTCs. The LGLC 185 is a contactor that connects/disconnects the LGEN 110 from the LAC bus 155. The RGLC 186 is a contactor that connects/disconnects the RGEN 115 from the RAC bus 160. The AGLC 187 is a contactor that connects/disconnects the AGEN 120 from designated AC buses. It should be understood that the contactors 185, 186, 187 are three phase contactors. It shall be noted that the AGEN 120 has no designated bus, but in one case, the AGLC 187 connects/disconnects the AGEN 120 from the rest of aircraft electric network.

As described herein, the AGEN 120 has no direct interface with the BTCs, LBTC 171, and RBTC 181, which are used for load transfer and aircraft electric power configuration. The statuses of the BTCs, LBTC 171, and RBTC 181, (e.g., opened/closed) are communicated to the AGCU 121 through the digital bus 106 from the LGCU 111 and the RGCU 116 respectively. In addition, since there is no direct interface between AGCU 121 and the BTCs 171, and 181, the disconnect request/command signals are indirect through combination of analog discrete and digital signals implemented between AGCU 121 and the LGCU 111 for LBTC and RGCU 116 for RBTC. In the case of AGEN 120 overcurrent condition, a source of the fault can be on the left, right or in between. In one embodiment, a multiple choice of BTC disconnect actions is considered in a sequence in the AGCU 121 or other suitable computing device in communication with the AGCU 121, and a state machine logic method is performed in a unique sequence based on assumptions and outcome as a core element in a logic decision process.

In one embodiment, an exemplary overcurrent protection method is based on readings from sensing current transformers in all three generator phases of any of the generators LGEN 110, RGEN 115 and AGEN 120. If any of the generator phase currents is sensed above certain threshold for a specific period of time, an overcurrent fault parameter is set logic "1" and overcurrent protection logic reacts to protect generator and aircraft feeders.

Figure 2:
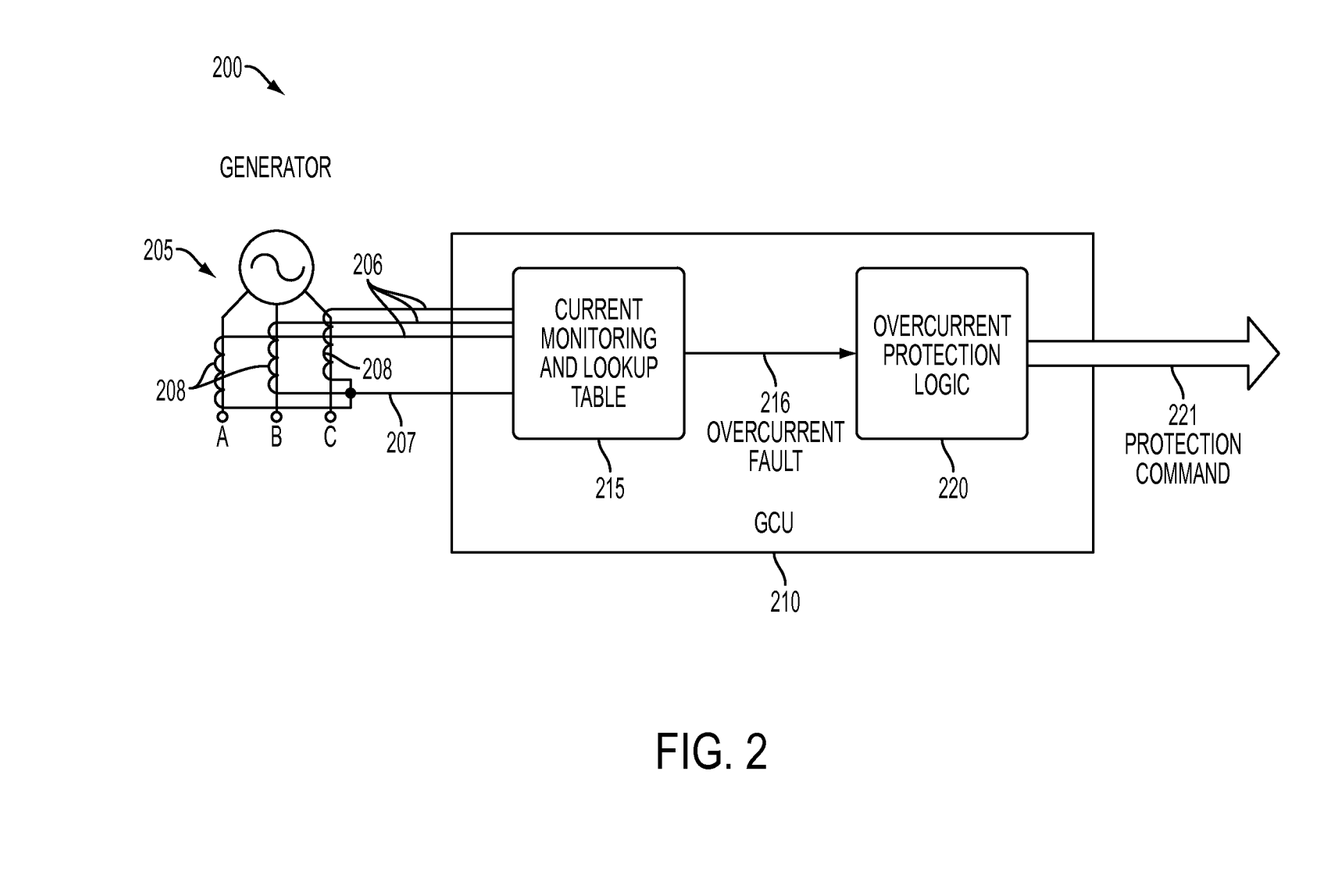
FIG. 2 schematically illustrates a generator control unit overcurrent protection logic function with a generator current monitoring interface.

FIG. 2 schematically illustrates a circuit 200 of an embodiment of current monitoring interface. The circuit is representative of any of the generators LGEN 110, RGEN 115 and AGEN 120. As illustrated, the circuit 200 includes a generator current transformer CT 208 having three phase current signals leads 206 and a common lead 207. In this example, current transformers are used as current sensors. However, other current sensors such as but not limited to Hall effect probes can be used in other exemplary embodiments. The leads 206, and 207 are connected to a generator control unit (GCU) 210, such as the LGCU 111, RGCU 116, and AGCU 121 of FIG. 1. The GCU 210 includes a current monitoring and lookup table 215 to which the current signals from the leads 206 are compared to determine an overcurrent condition. Depending on the result of the comparison, an overcurrent fault output 216 is generated that is input into overcurrent protection logic 220 that generates a protection commands output 221 as described further herein.

Figure 3:
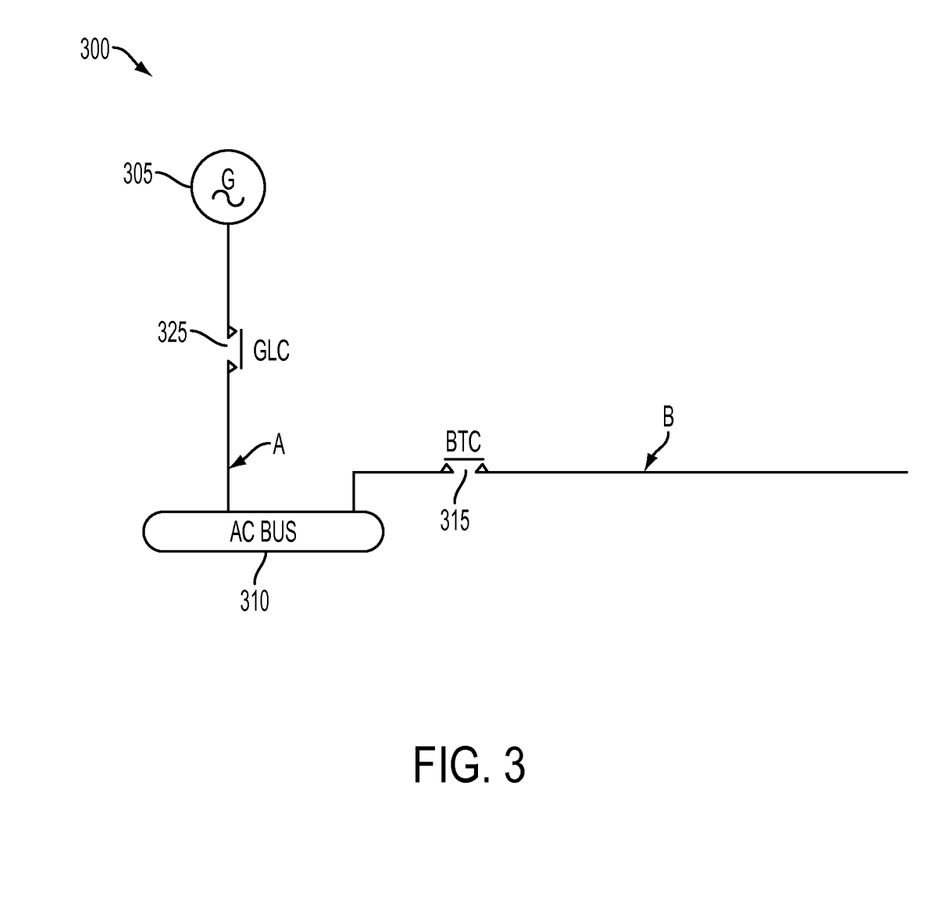
FIG. 3 schematically illustrates a circuit portion of the system of FIG. 1 with three possible overcurrent fault locations relevant for the Left/Right main generator.

In one embodiment, each main generator LGEN 110, RGEN 115 is considered as an independent power channel feeding a single aircraft AC Bus, or it can feed other AC buses through the different arrangement of associated BTC. FIG. 3 schematically illustrates a circuit portion 300 of the system 100 of FIG. 1. As illustrated, the circuit portion 300 includes a main generator 305, for example the LGEN 110 or RGEN 115 of FIG. 1. The circuit portion 300 further includes an AC power bus 310 such as busses LAC 155 or RAC 160 of FIG. 1. The circuit portion 300 further includes associated BTC such as LBTC 171, RBTC 181 of FIG. 1. The circuit portion 300 further includes a GLC such as the LGLC 185, or RGLC 186 of FIG. 1. In one embodiment, depending on the aircraft power configuration, an overcurrent condition can be located either downstream of the BTC at point B or upstream of the BTC in point A. To maintain independence among the power sources (e.g., among the LAC bus 155, and the RAC bus 160), and to protect the main generators LGEN 110, RGEN 115 from overcurrent faults, each of the LGCU 111, the RGCU 116 in each respective power channel has partial control of associated BTCs.

Figure 4:
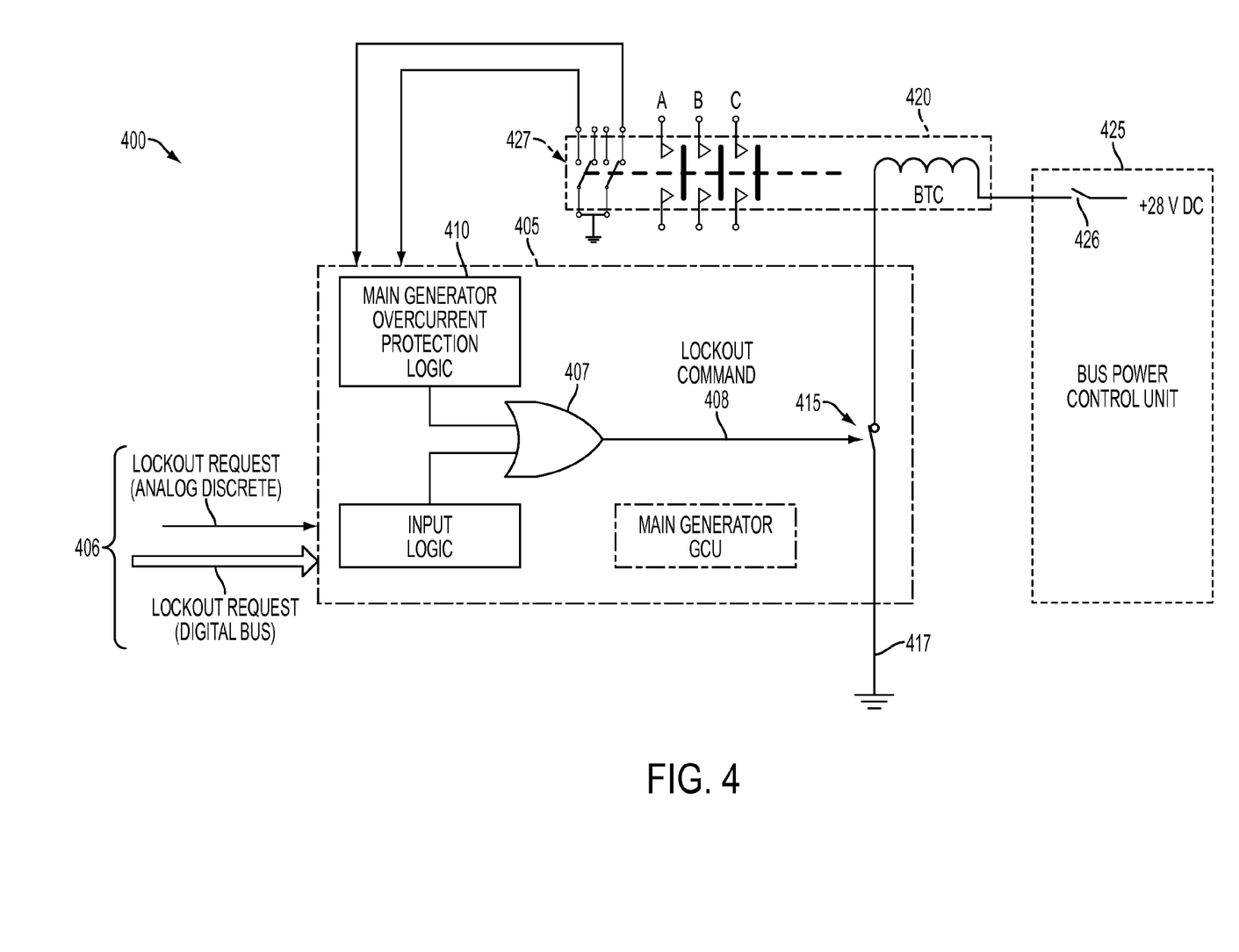
FIG. 4 schematically illustrates a bus tie contactor electrical interface of the system of FIG. 1.

FIG. 4 schematically illustrates a BTC electrical interface 400 of the system 100 of FIG. 1. FIG. 4 schematically illustrates that a GCU 405 such as the LGCU 111, or RGCU 116, of FIG. 1 is configured to receive a lockout request signal 406 from an AGCU as a combination of an analog discreet signal and a digital parameter received over digital bus that can be logically combined with protection logic 410 as described further herein. As illustrated, a logic "OR" function 407 provides a lockout command logic output 408 that can open switch 415 of the BTC 420, such as the LBTC 171, or RBTC 181 of FIG. 1. The BTCs 420 are coupled to a BPCU 425 such as the BPCU 190 of FIG. 1. The BTC 420 is connected to the BPCU 425 via switch 426. FIG. 4 illustrates that BTC 420 can be individually switched ON and OFF from the BPCU 425 but only switched OFF from the associated GCU 405.

In one embodiment, an overcurrent method is included in the protection logic 410 of the GCU 405. Based on power channel configuration, feeding a single AC Bus or multiple AC buses, the first level of the overcurrent protection relies on opening associated BTC 420. In addition, the GCU 405 provides a lockout of the BTC 420 by removing the grounding path 417 for the coil drive of the associated BTC 420 via the switch 415. In one embodiment, if an overcurrent fault still exists after BTC 420 is open, a second level of overcurrent protection is applied through the opening of the main generator line contactor (GLC) (see for example the GLC 325 of FIG. 3), and shutting down generator excitation field (for example, in the LGEN 110, RGEN 115 of FIG. 1). In order to determine whether the generators are powering single or multiple buses, the associated BTC status can be implemented. If an associated BTC 420 is open, then main generator is powering a single AC Bus. Any other configuration of the associated BTC 420 means that main generator is powering multiple buses. An Open/Close status of the each BTC is indicated to associated GCUs through a pair of auxiliary contact 427.

In one embodiment, the main generator overcurrent protection method can be implemented on several system configurations. In one configuration, the main generator powers a single AC bus. Since associated BTC 420 is open, the overcurrent protection fault is latched and the GCU 405 shuts down the generator excitation field and disconnects the main GLC (see GLC 325 FIG. 3 for example). Once the overcurrent protection fault is latched, a parameter "Overcurrent Protection Fault" is transmitted over the digital bus (see digital bus 106 in FIG. 1) via the overcurrent protection logic (see overcurrent protection logic 220 in FIG. 2). At the same time, the GCU 405 commands the BTC 420 to lockout in order to isolate fault location from the rest of aircraft network.

In another configuration, the main generator is powering multiple AC buses. As BTC 420 is closed, when an overcurrent fault is detected GCU 405 lockout/de-energizes the associated BTC 420. If the overcurrent fault is still present after a predetermined time delay (e.g., 100 milliseconds), the GCU latches the overcurrent protection fault, shuts down the generator excitation field, and de-energizes the main GLC (see GLC 325 FIG. 3 for example). At the same time a digital bus "Overcurrent Protection Fault" parameter is transmitted over the digital bus (see digital bus 106 in FIG. 1) via the overcurrent protection logic (see overcurrent protection logic 220 in FIG. 2).

In one embodiment, the BTC 420 may have a dormant failure where contacts are in a permanently close position. In that case, the main generator overcurrent protection method can recognize the BTC fault through a process as now described. If the overcurrent fault is still present after a predetermined time period (e.g., 100+/−20 ms) since BTC lockout command was issued, and the BTC 420 is not open, then a BTC_FAULT is latched together with the overcurrent protection fault. As a result, the overcurrent protection logic de-energizes the main GLC, and shut down the main generator excitation field. A BTC_FAULT parameter is then latched and transmitted over the digital bus. A BTC Lockout Command, Overcurrent Protection Fault, and the BTC_FAULT parameters are latched.

Figure 5:
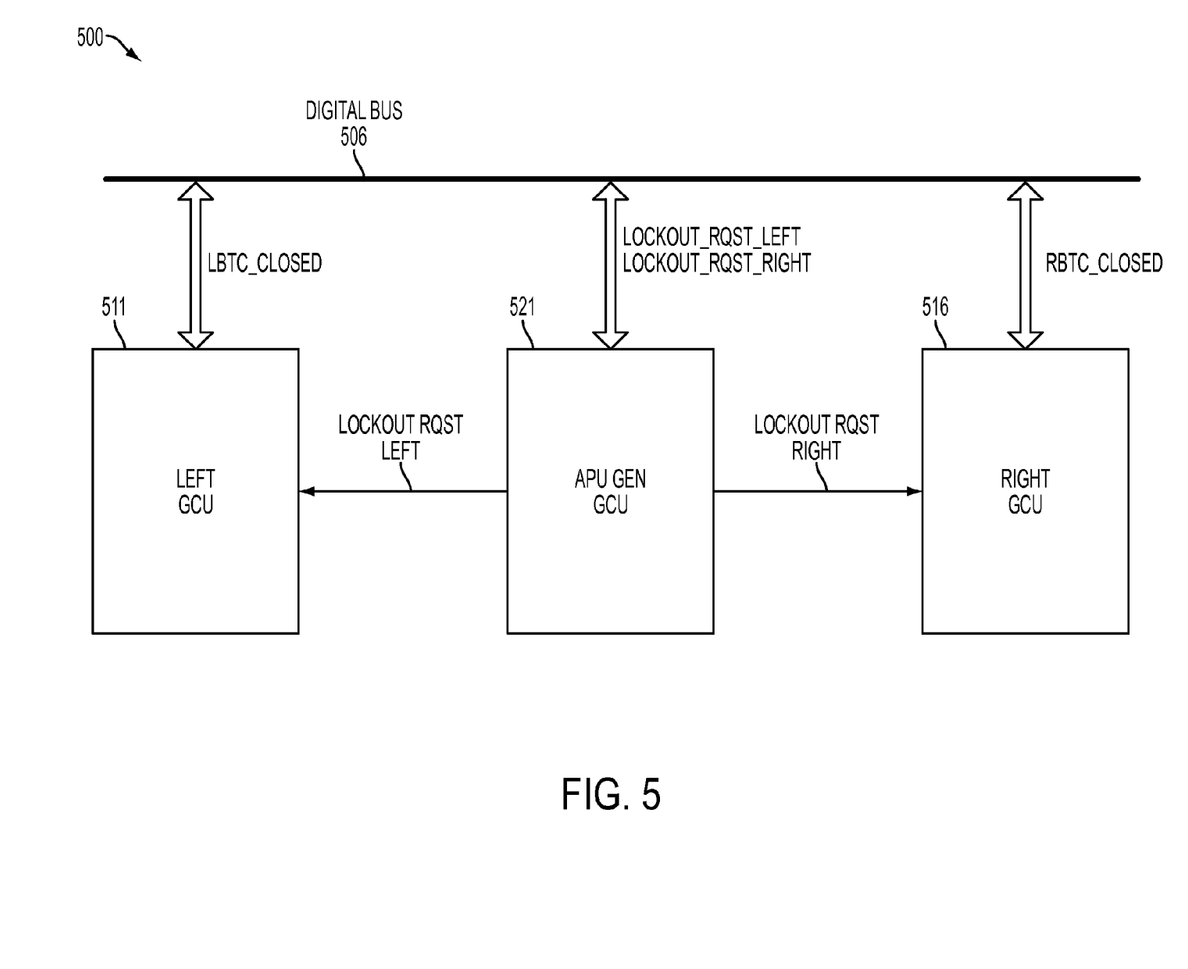
FIG. 5 schematically illustrates an interface between respective generator control units of the system of FIG. 1.

In one embodiment, the AGEN (see AGEN 120 in FIG. 1) also includes an over current protection method, which is based on sensing current transformers in all three AGEN phases. If any one of the AGEN phase currents is sensed above certain threshold for a specific period of time, an overcurrent fault logic parameter is detected and the GCU overcurrent protection logic (see overcurrent protection logic 220 in FIG. 2 for example) reacts to protect generator and aircraft feeders. FIG. 5 schematically illustrates an interface 500 of the system 100 of FIG. 1. The interface 500 is defined between the AGCU 121 and the LGCU 111 and the RGCU 116. In one embodiment, discrete signal parameters "Lockout Request Left" and "Lockout Request Right" are also transmitted over the digital bus 506 from the AGCU 521 to the LGCU 511 and RGCU 516, while "LBTC OPEN", and "RBTC OPEN" are digital bus parameters, transmitted from the LGCU 511 and the RGCU 516 to the AGCU 521.

In one embodiment, for AGCU 521 power configurations, the first level of the overcurrent protection relies on opening the LBTC 171 or the RBTC 181 (se FIG. 1). The second level of overcurrent protection is opening of the AGLC 187 (see FIG. 1), and shutting down the AGEN excitation field. AGEN overcurrent protection operates based on several system configurations as now described. In one configuration, the AGEN 120 powers only LAC 155 (see FIG. 1). When the overcurrent fault is detected, the overcurrent protection logic (see overcurrent protection logic 220 in FIG. 2) requests the LGCU 111 to lockout/de-energize the associated channel BTC. The LGCU 111 then lockout/de-energizes the BTC LBTC by removing the ground to the BTC coil (see FIG. 4). If the overcurrent fault is still present after a predetermined time period (e.g., 100+/−20 milliseconds), the overcurrent protection logic 220 disconnects the AGLC 187, and shuts down the AGEN excitation field. At the same time an overcurrent protection logic 220 requests that the RGCU 116 lockout/de-energizes the associated channel BTC RBTC to isolate overcurrent fault from the rest of aircraft network.

In a configuration in which the AGEN 120 powers only the RAC 160, when an overcurrent fault is detected, the overcurrent protection logic 220 requests that the RGCU 116 lockout/de-energizes the associated channel BTC. The RGCU 116 lockout/de-energizes the BTC by removing the ground to the BTC coil (see FIG. 4). If the overcurrent fault is still present after a pre-determined time period (e.g., 100+/−20 milliseconds), the overcurrent protection logic 220 disconnects the AGLC 187, and shuts AGEN excitation field. At the same time, overcurrent protection logic 220 requests that the LGCU 111 lockout/de-energizes the associated channel BTC to isolate overcurrent fault from the rest of aircraft network.

It can be appreciated that BTCs can fail and remain in a permanently closed position. As such, the BTC fault is dormant and can be detected only when the associated GCU issues a lockout command. When an overcurrent fault condition exists, and the overcurrent protection logic 220 requests to open the BTC, if the overcurrent fault still exists after a predetermined time period (e.g., 100+/−20 milliseconds), and requested BTC is not open, then the overcurrent protection logic 220 de-energizes the AGLC 187, and shuts down the AGEN excitation field. At the same time, overcurrent protection logic 220 requests a BTC lockout on both sides to isolate overcurrent fault from the rest of the aircraft network.

In a configuration in which the AGEN 120 powers the LAC 155 and the RAC 160, when an overcurrent fault is detected, the overcurrent protection logic 220 first requests the LGCU 111 to lockout/de-energize the LBTC 171. The LGCU 111 lockout/de-energizes associated BTC by removing the ground to the BTC coil (see FIG. 4). If the overcurrent fault is still present after a predetermined time period (e.g., 100+/−20 milliseconds) and the LBTC 171 is open, then the overcurrent protection logic 220 requests the RGCU 116 to lockout/de-energize the RBTC 181. The RGCU 116 lockout/de-energizes associated BTC by removing the ground to the contactor coil (see FIG. 4). If the fault was removed, the overcurrent protection logic 220 removes the BTC lockout request from the left channel, while right lockout request remain latched. A second timer is triggered by two conditions: the first timer has expired and State 2 conditions exist as further described herein. In addition, LBTC 171, and RBTC 181 are open, then the overcurrent protection logic 220 de-energizes the AGLC 187 and, shuts down AGEN excitation field.

In a configuration in which the AGEN 120 is not powering any of AC buses and there exists an overcurrent fault condition, the overcurrent protection logic 220 de-energizes the AGLC 187, shuts down the AGEN excitation field, and requests lockout for all the BTCs to isolate an overcurrent fault location from the rest of aircraft network.

Figure 6:
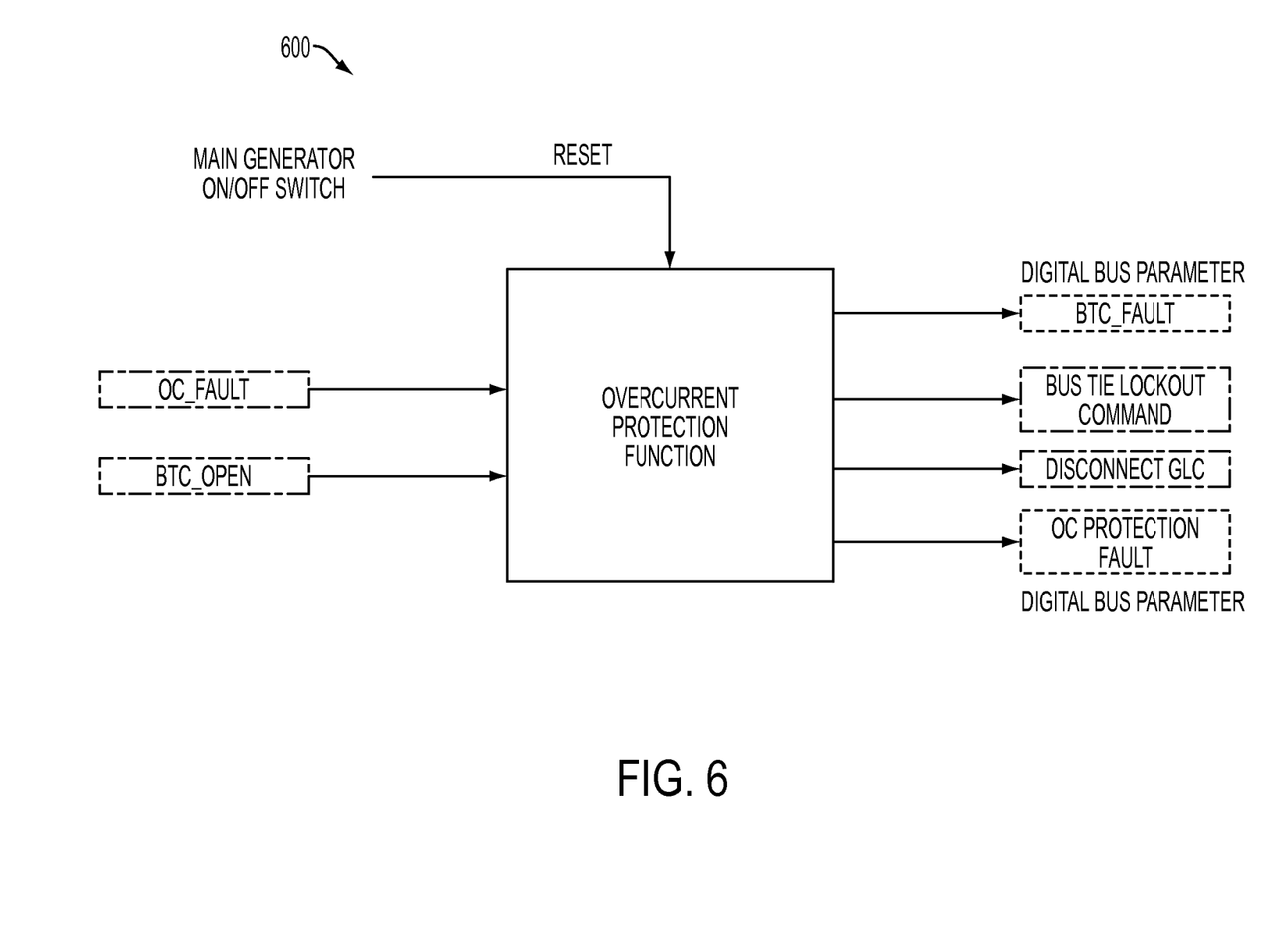
FIG. 6 illustrates an overcurrent protection block diagram for a left and right main generator control unit.

FIG. 6 illustrates the main generator overcurrent protection input/output block diagram. It will be appreciated that a timer is triggered by an overcurrent fault logic signal. The output of the "Timer" is reset when an overcurrent fault logic signal change from logic 1 (active fault) to logic 0 (no fault). The timer is implemented to: 1) Be "a filter" which will prevent nuisance faults/trips to propagate and cause unnecessary power disconnect and 2) provide a delay to accommodate system reaction time required for relevant elements to react. For instance, the opening process of the bus tie contactors may take between 20 to 30 milliseconds. As such, a specific time delay can be incorporated from the moment when fault is detected to the moment when fault is removed due to time required cascading reaction of the system itself.

Figure 7:
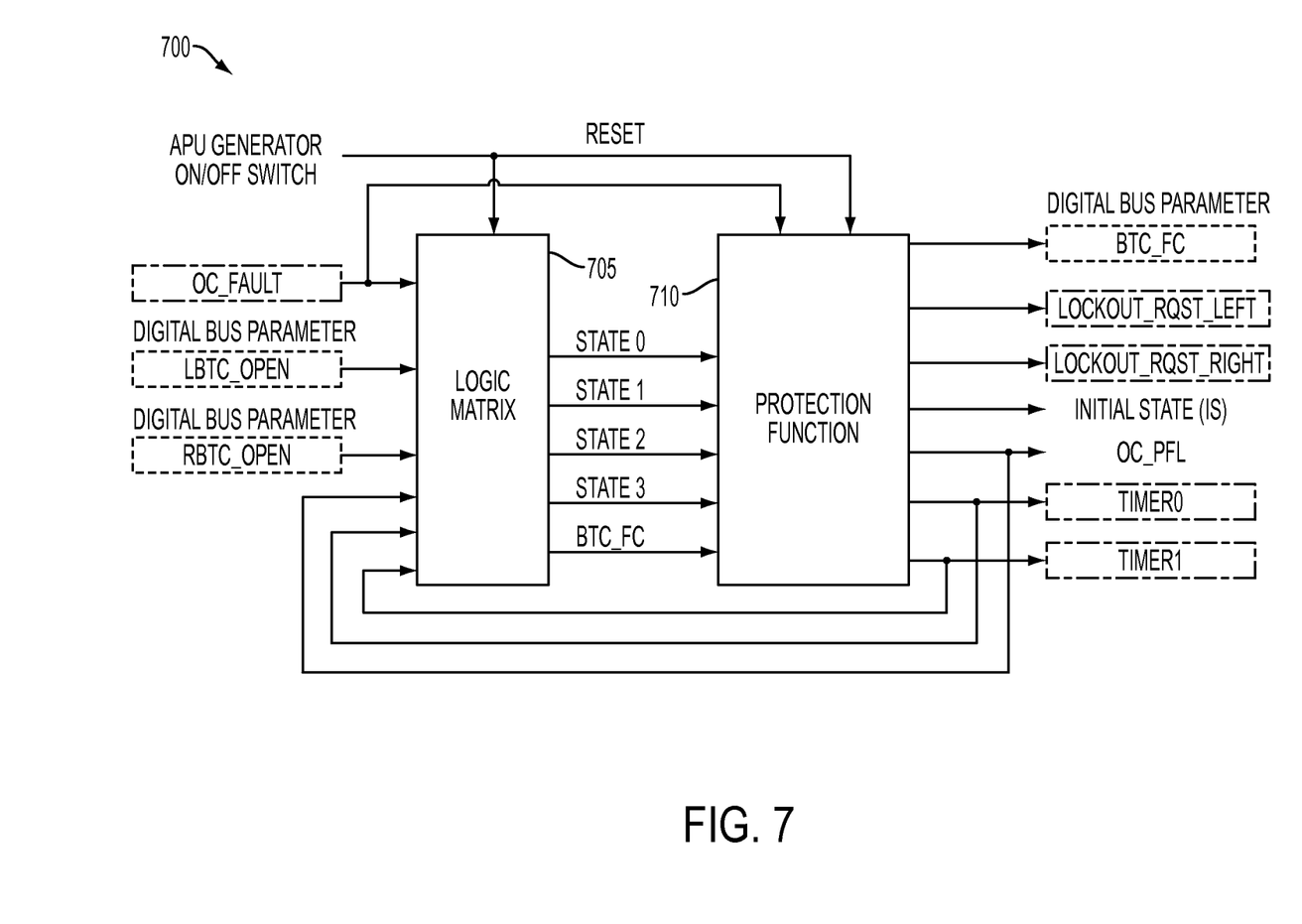
FIG. 7 illustrates an overcurrent protection block diagram for an auxiliary power generator control unit.
Figure 8:
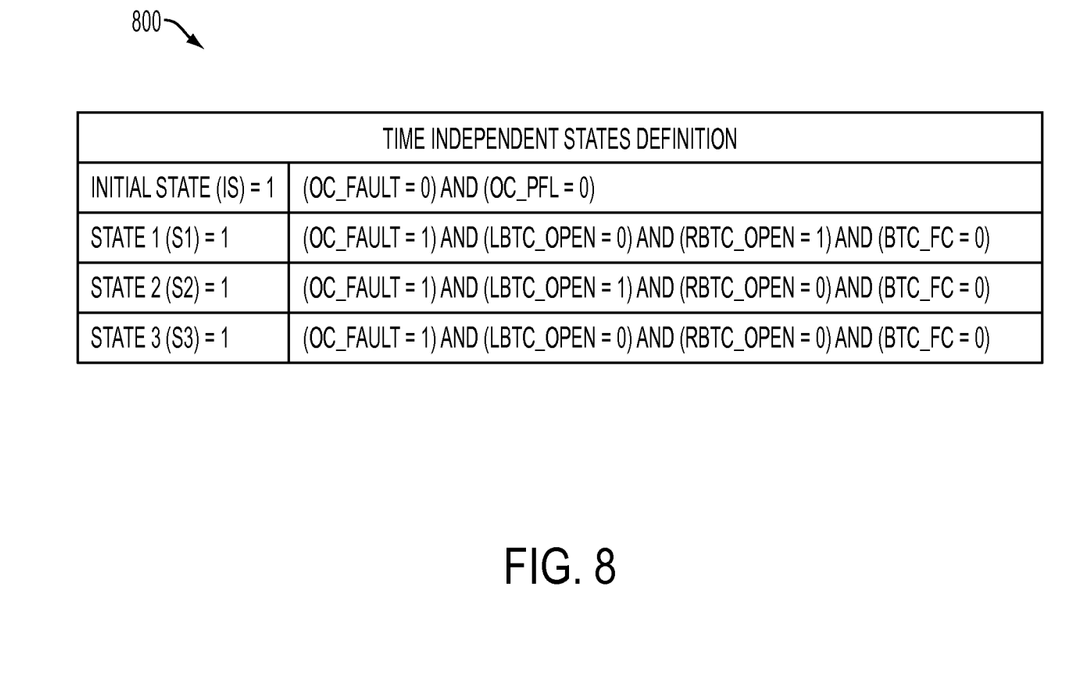
FIG. 8 illustrates a time independent states definition table.

FIG. 7 illustrates an AGEN overcurrent protection block diagram 700, showing a logic matrix 705 and protection function 710. The protection function block diagram 710 includes a finite number of possible state combinations whose outputs depend not only on current inputs but also on previous inputs. The State Machine diagram (see FIG. 9) aids in describing the exemplary overcurrent protection methods described herein. In one embodiment, the overcurrent protection method can have seven states. Four states are time independent with logic conditions defined in a time independent states definition table 800 of FIG. 8. States S0, BTC Fault Condition (BTC_FC) and Overcurrent Protection Fault Latched (OC_PFL) are time dependent states.

Figure 9:
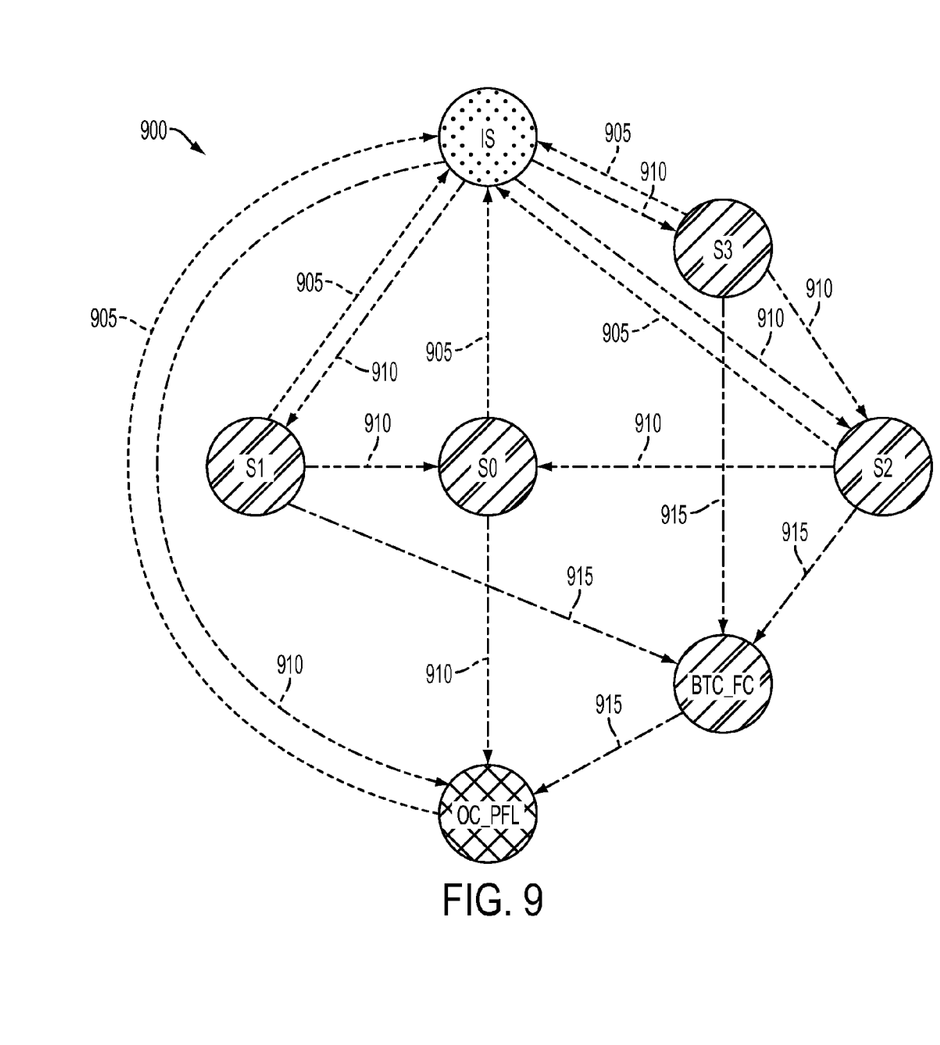
FIG. 9 that illustrates a diagram of State Machine transition definitions.

In one embodiment, upon OC Fault detection, State Machine can switch from the Initial State (IS) to any one of three other States, S1, S2, or S3, one at the time, depending on the input conditions defined by LBTC and RBTC Open/Close status. Each State itself has own action which will change the initial conditions in a way so that overcurrent fault will change or BTCs Open/Close status will change. Depending on the new input conditions, a State Machine can return into the Initial State (IS) or can switch to other possible states. The State called OC_PFL is final state from where the State Machine can exit only when overcurrent fault is cleared AND reset command applied. Possible transitions of the AGEN overcurrent protection State Machine are shown in FIG. 9 that illustrates a diagram 900 of State Machine transition definitions. Arrows 905 represents that the overcurrent fault is cleared and that the State Machine returns to the IS. Arrows 910 indicates the State Machine's possible transitions upon an overcurrent fault occurrence. Arrows 915 indicate State Machine transitions as a result of an overcurrent fault and the BTC_FC ending in the OC_PFL state.

Figure 10:
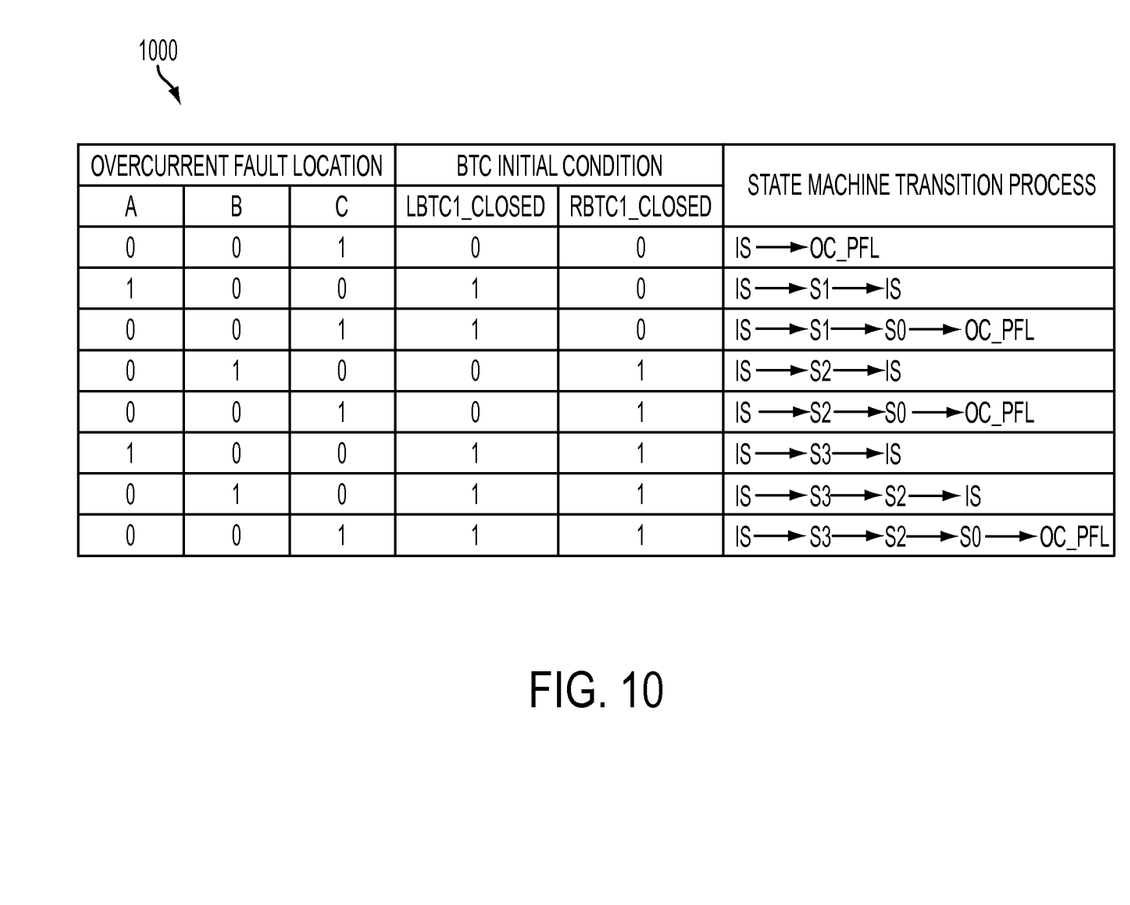
FIG. 10 illustrates a State Machine matrix table with possible state transitions.
Figure 11:
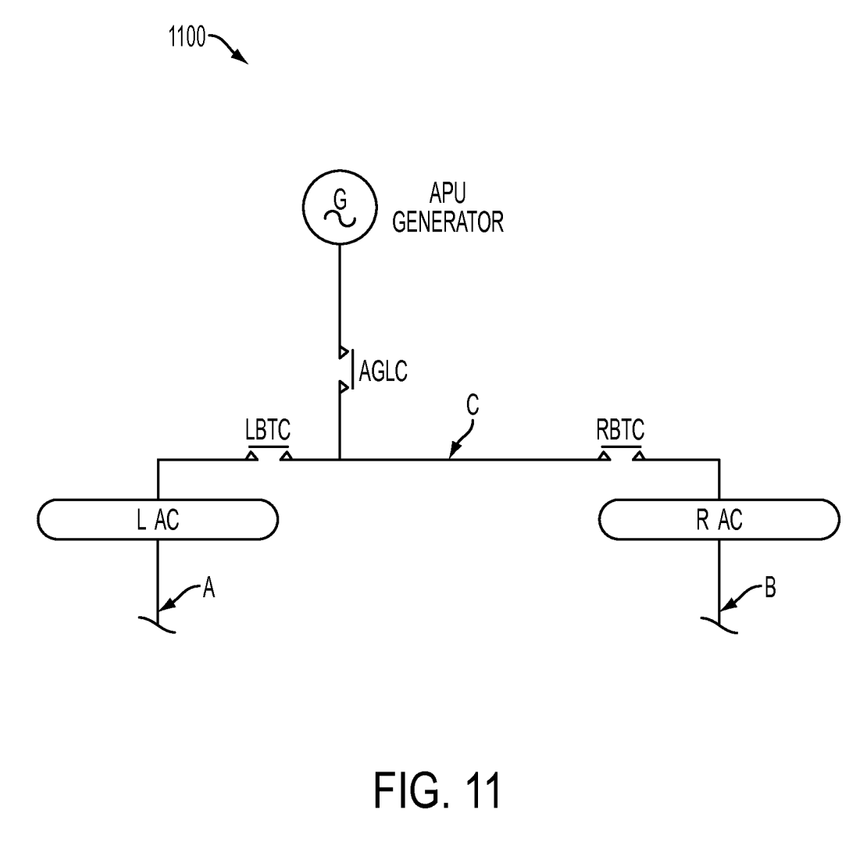
FIG. 11 illustrates a circuit portion of the system of FIG. 1 with three possible overcurrent fault locations relevant for the auxiliary power unit generator.

Since overcurrent faults can be located at different places relevant to the AGEN power source, several different overcurrent fault conditions are considered. FIG. 10 illustrates a matrix 1000, presenting possible "Normal Cases-Single Event" overcurrent faults with State Machine transitions. FIG. 11 illustrates a circuit portion 1100 of the system 100 of FIG. 1 illustrating possible overcurrent fault location points A, B, or C under several test cases.

Figure 12:
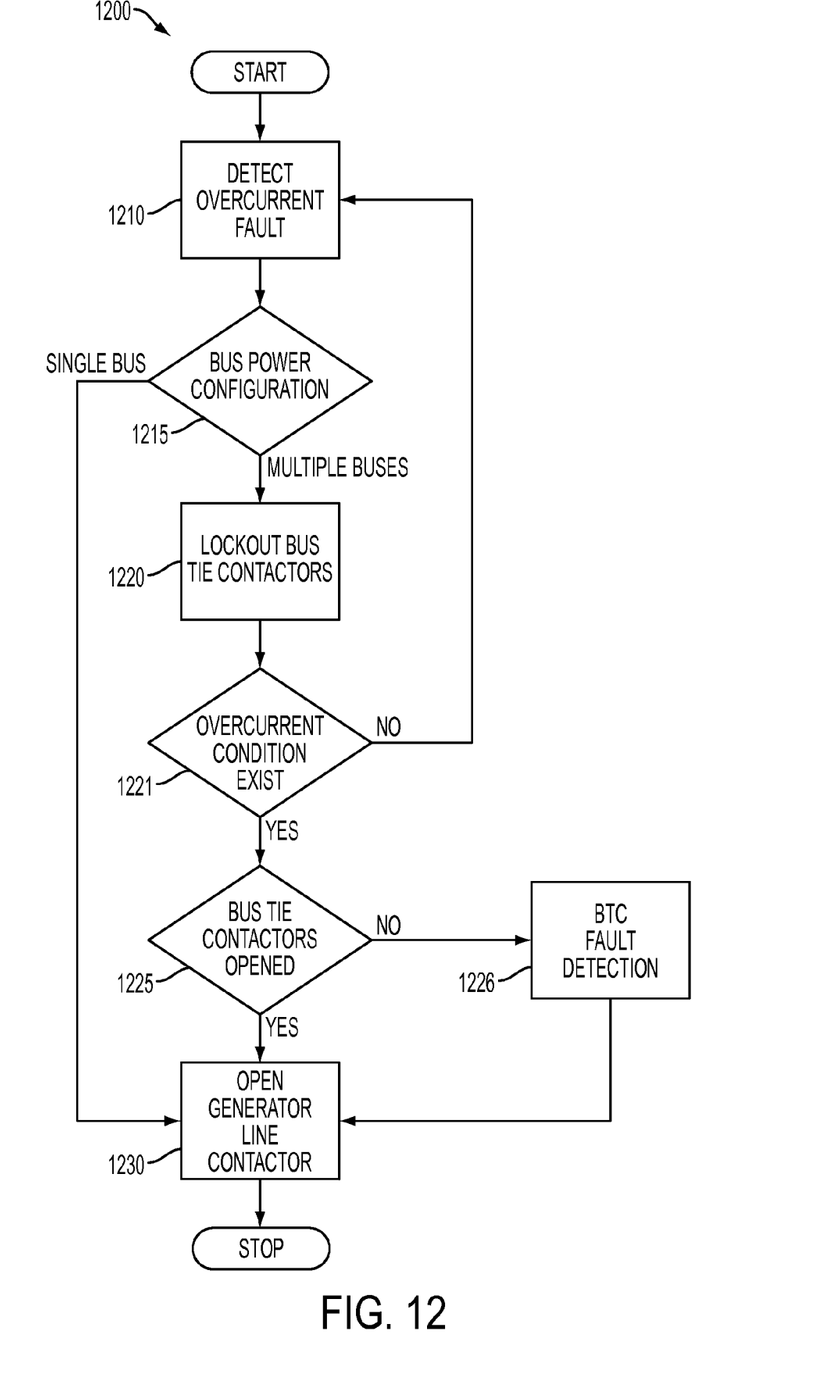
FIG. 12 illustrates a flowchart overall overcurrent protection method in accordance with exemplary embodiments.

FIG. 12 illustrates a flowchart overall overcurrent protection method 1200 as described herein in accordance with exemplary embodiments. At block 1210, the GCUs described herein detect an overcurrent fault condition. At block 1215, the system decides whether there is a single bus configuration or a multiple bus configuration. If it is a single bus configuration, then at block 1230, the GCUs open associated GLC. If the system is a multiple bus configuration at block 1215, then at block 1220, the GCUs lockout relevant BTCs. At block 1221, the GCUs determine if there is an overcurrent condition. If there is no overcurrent condition at block 1221, then the method continues at block 1210. If an overcurrent condition still exist at block 1221, then at block 1225, the GCUs determine if the BTCs are open. If the BTCs are open at block 1225, then at block 1230, the GCUs open associated GLC. If the BTCs are not open at block 1225, then the GCUs implement BTC fault detection at block 1226 as described herein, and proceed with opening associated GLC at block 1230. Depending on how the main generators or the auxiliary power generator powers the AC buses, other aspects of the overcurrent protection method are performed as described herein. It can be appreciated that as described herein, timers are implemented along with state machine algorithms with several possible options such that the method 1200 is also applicable to the APU Generator.

The GCUs can be any suitable microcontroller or programmable logic structure for executing the instructions (e.g., on/off commands) described herein. As such, the suitable microcontroller or microprocessor can be any custom made or commercially available processor, a central processing unit (CPU), an auxiliary processor among several processors, a discrete or integrated logic devices, (in the form of a microchip or chip set), a macroprocessor, or generally any device for executing software instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, hosted applications etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the methods are implemented in hardware, the methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include allowing other power sources to be reconfigured in response to an AGEN overcurrent fault via an overcurrent protection method. In addition, where BTCs have a dormant failure, the failure can be detected and isolated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An overcurrent fault protection method, comprising:
   detecting an overcurrent fault in a variable frequency electric power generation system (VF EPGS), the VF EPGS having a first main generator coupled to a first alternating current (AC) bus through a first generator line contactor (GLC), a second main generator coupled to a second AC bus through a second GLC and an auxiliary generator coupled to a plurality of bus tie contactors (BTCs), through a third GLC, and coupled to at least one of the first and second AC buses through the plurality of BTCs;
   in response to the detection of the overcurrent fault, locking out one or more of the plurality of BTCs; and
   in response to a continued detection of the overcurrent fault, opening at least one of the first, second and third GLCs and;
   locking out a first subset of the plurality of BTCs coupled between the auxiliary generator and the first AC bus in response to the auxiliary generator powering the first AC bus;
   opening the third GLC and shutting down the auxiliary generator in response to the continued detection of the overcurrent fault after a predetermined time delay; and
   locking out a second subset of the plurality of BTCs coupled between the auxiliary generator and the second AC bus.

2. The method as claimed in claim 1 further comprising shutting down the at least one of the first and second main generators in response to each of at least one of the first and second main generators powering one of the first and second AC buses and all of the plurality of the BTCs are open.

3. The method as claimed in claim 1 further comprising:
   shutting down the at least one of the first and second main generators after a predetermined time delay in response to at least one of the first and second main generators powering both of the first and second AC buses and a subset of the plurality of the BTCs open; and
   de-energizing at least one of the first, second and third GLCs.

4. The method as claimed in claim 1 further comprising:
   locking out a first subset of the plurality of BTCs coupled between the auxiliary generator and the second AC bus in response to the auxiliary generator powering the second AC bus;
   opening the third GLC and shutting down the auxiliary generator in response to the continued detection of the overcurrent fault after a predetermined time delay; and
   locking out a second subset of the plurality of BTCs coupled between the auxiliary generator and the first AC bus.

5. The method as claimed in claim 1 further comprising:
   locking out a first subset of the plurality of BTCs coupled between the auxiliary generator and the first AC bus in response to the auxiliary generator powering the first AC bus and the second AC bus;
   locking out a second subset of the plurality of BTCs coupled between the auxiliary generator and the second AC bus in response to the continued detection of the overcurrent fault after a first predetermined time delay; and
   opening the third GLC and shutting down the auxiliary generator in response to the continued detection of the overcurrent fault after a second predetermined time delay.

6. The method as claimed in claim 1 further comprising locking out the third GLC, shutting down the auxiliary generator and locking out the plurality of BTCs in response to the auxiliary generator not powering the first AC bus and second AC bus.

7. A computer program product including a non-transitory computer readable medium storing instructions for causing a computer to implement an overcurrent fault protection method, the method comprising:
   detecting an overcurrent fault in a variable frequency electric power generation system (VF EPGS) having a first main generator coupled to a first alternating current (AC) bus through a first generator line contactor (GLC), a second main generator coupled to a second AC bus through a second GLC and an auxiliary generator coupled to a plurality of bus tie contactors (BTCs), through a third GLC, and coupled to at least one of the first and second AC buses through the plurality of BTCs;
   locking out one or more of the plurality of BTCs in response to the detection of the overcurrent fault; and
   opening at least one of the first second and third GLCs in response to a continued detection of the overcurrent fault;
   locking out a first subset of the plurality of BTCs coupled between the auxiliary generator and the first AC bus in response to the auxiliary generator powering the first AC bus;
   opening the third GLC and shutting down the auxiliary generator in response to the continued detection of the overcurrent fault after a predetermined time delay; and
   locking out a second subset of the plurality of BTCs coupled between the auxiliary generator and the second AC bus.

8. The computer program product as claimed in claim 7 wherein the method further comprises shutting down the at least one of the first and second main generators in response to at least one of the first and second main generators powering one of the first and second AC buses and all of the plurality of the BTCs open.

9. The computer program product as claimed in claim 7 wherein the method further comprises:
   shutting down the at least one of the first and second main generators after a predetermined time delay in response to at least one of the first and second main generators powering both of the first and second AC buses and a subset of the plurality of the BTCs open; and
   de-energizing at least one of the first, second and third GLCs.

10. The computer program product as claimed in claim 7 wherein the method further comprises:
    locking out a first subset of the plurality of BTCs coupled between the auxiliary generator and the second AC bus in response to the auxiliary generator powering the second AC bus;

opening the third GLC and shutting down the auxiliary generator in response to the continued detection of the overcurrent fault after a predetermined time delay; and locking out a second subset of the plurality of BTCs coupled between the auxiliary generator and the first AC bus.

11. The computer program product as claimed in claim 7 wherein the method further comprises:

locking out a first subset of the plurality of BTCs coupled between the auxiliary generator and the first AC bus in response to the auxiliary generator powering the first AC bus and the second AC bus;

locking out a second subset of the plurality of BTCs coupled between the auxiliary generator and the second AC bus in response to the continued detection of the overcurrent fault after a first predetermined time delay; and opening the third GLC and shutting down the auxiliary generator in response to the continued detection if the overcurrent fault after a second predetermined time delay.

12. The computer program product as claimed in claim 7 wherein the method further comprises locking out the third GLC, shutting down the auxiliary generator and locking out the plurality of BTCs in response to the auxiliary generator not powering the first AC bus and second AC bus.

13. A variable frequency electric power generation system (VF EPGS), comprising:

a first generator coupled to a first generator control unit (GCU) and to a first alternating current (AC) bus through a first generator line contactor (GLC);

a second generator coupled to a second GCU and to a second AC bus through a second GLC; and an auxiliary generator coupled to a third GCU and to a plurality of bus tie contactors (BTCs), through a third GLC, and coupled to at least one of the first and second AC buses through the plurality of BTCs, wherein the first, second and third GCUs are configured to:

detect an overcurrent fault;

lock out one or more of the plurality of BTCs in response to detecting the overcurrent fault;

open at least one of the first second and third GLCs in response to a continued detection of the overcurrent fault;

lock out a first subset of the plurality of BTCs coupled between the auxiliary generator and the first AC bus in response to the auxiliary generator powering the first AC bus;

open the third GLC and shutting down the auxiliary generator in response to the continued detection of the overcurrent fault after a predetermined time delay; and lock out a second subset of the plurality of BTCs coupled between the auxiliary generator and the second AC bus.

14. The VF EPGS as claimed in claim 13 wherein the first and second GCUs are further configured to shut down the at least one of the first and second main generators in response to at least one of the first and second main generators powering one of the first and second AC buses and all of the plurality of the BTCs open.

15. The VF EPGS as claimed in claim 13 wherein the first and second GCUs are further configured to:

shut down the at least one of the first and second main generators after a predetermined time delay in response to at least one of the first and second main generators powering both of the first and second AC buses and a subset of the plurality of the BTCs open; and de-energize at least one of the first, second and third GLCs.

16. The VF EPGS as claimed in claim 13 wherein the third GCU is further configured to:

lock out a first subset of the plurality of BTCs coupled between the auxiliary generator and the second AC bus in response to the auxiliary generator powering the second AC bus;

open the third GLC and shutting down the auxiliary generator in response to the continued detection of the overcurrent fault after a predetermined time delay; and lock out a second subset of the plurality of BTCs coupled between the auxiliary generator and the first AC bus.

17. The VF EPGS as claimed in claim 13 wherein the third GCU is further configured to:

lock out a first subset of the plurality of BTCs coupled between the auxiliary generator and the first AC bus in response to the auxiliary generator powering the first AC bus and the second AC bus;

lock out a second subset of the plurality of BTCs coupled between the auxiliary generator and the second AC bus in response to the continued detection of the overcurrent fault after a first predetermined time delay; and open the third GLC and shut down the auxiliary generator in response to the continued detection if the overcurrent fault after a second predetermined time delay.

* * * * *